US011856024B2

United States Patent
dos Santos Silva et al.

(10) Patent No.: US 11,856,024 B2
(45) Date of Patent: Dec. 26, 2023

(54) PROHIBITING VOICE ATTACKS

(71) Applicant: International Business Machines Corporation, Armonk, NY (US)

(72) Inventors: Bruno dos Santos Silva, McKinney, TX (US); Cheng-Ta Lee, Chamblee, GA (US); Howard Ruihua Zhao, Tucson, AZ (US); Socheat Sou, Ann Arbor, MI (US); James Edward Damgar, Pima, AZ (US); George Patrick Carper, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 420 days.

(21) Appl. No.: 17/351,310

(22) Filed: Jun. 18, 2021

(65) Prior Publication Data

US 2022/0407886 A1   Dec. 22, 2022

(51) Int. Cl.
*H04L 9/40* (2022.01)
*G10L 21/02* (2013.01)
(Continued)

(52) U.S. Cl.
CPC ...... *H04L 63/1483* (2013.01); *G06F 16/2255* (2019.01); *G10L 15/10* (2013.01);
(Continued)

(58) Field of Classification Search
CPC ............. H04L 63/1483; H04L 63/1416; H04L 63/0245; H04L 63/1466; G06F 16/2255;
(Continued)

(56) References Cited

U.S. PATENT DOCUMENTS

| 10,896,664 B1 | 1/2021 | Buesser |
| 2019/0122691 A1* | 4/2019 | Roy .................. H04B 1/04 |

(Continued)

FOREIGN PATENT DOCUMENTS

| CN | 101127777 A | 2/2008 |
| CN | 110992934 A | 4/2020 |
| CN | 113646833 A * | 11/2021 |

OTHER PUBLICATIONS

Schönherr, Lea, et al. "Adversarial attacks against automatic speech recognition systems via psychoacoustic hiding." arXiv preprint arXiv:1808.05665 (2018). (Year: 2018).*

(Continued)

*Primary Examiner* — Michael R Vaughan
(74) *Attorney, Agent, or Firm* — Sonny Zhan; Heather Johnston

(57) ABSTRACT

In an approach for prohibiting voice attacks, a processor, in response to receiving a voice input from a source, determines, using a predetermined filter including an allowlist, that the voice input does not match any corresponding entry of the predetermined filter. A processor routes the voice input to an adversarial pipeline for processing. A processor identifies an adversarial example of the voice input using a predetermined connectionist temporal classification method. A processor generates a configurable distorted adversarial example using the adversarial example identified. In response to a user reply, a processor injects the configurable distorted adversarial example as noise into a voice stream of the user reply in real-time to alter the voice stream. A processor routes the altered voice stream to the source.

20 Claims, 7 Drawing Sheets

(51) Int. Cl.
G10L 15/10 (2006.01)
G10L 15/22 (2006.01)
G06F 16/22 (2019.01)

(52) U.S. Cl.
CPC .............. *G10L 15/22* (2013.01); *G10L 21/02* (2013.01); *H04L 63/1416* (2013.01)

(58) Field of Classification Search
CPC ......... G10L 15/10; G10L 15/22; G10L 21/02; G10L 17/26; G10L 21/06; H04K 1/00
See application file for complete search history.

(56) References Cited

U.S. PATENT DOCUMENTS

| | | | |
|---|---|---|---|
| 2019/0238568 A1* | 8/2019 | Goswami | G06F 21/566 |
| 2020/0227030 A1 | 7/2020 | Tan | |
| 2020/0234184 A1 | 7/2020 | Kesarwani | |
| 2020/0395035 A1 | 12/2020 | Kolter | |
| 2020/0402516 A1* | 12/2020 | Trim | G10L 17/22 |
| 2021/0021592 A1 | 1/2021 | Wright | |
| 2021/0193174 A1* | 6/2021 | Enzinger | G10L 17/00 |

OTHER PUBLICATIONS

Mathov, Yael, et al. "Stop Bugging Me! Evading Modern-Day Wiretapping Using Adversarial Perturbations." arXiv preprint arXiv:2010.12809 (2020). (Year: 2020).*

"Adversarial Robustness Toolbox (ART)—Python Library for Machine Learning Security—Evasion, Poisoning, Extraction, Inference", GitHub, Printed Apr. 13, 2021, 3 pages, <https://github.com/Trusted-AI/adversarial-robustness-toolbox>. o.

"Attackers are calling: Voice phishing on the rise", Cybertalk, Sep. 23, 2019, 3 pages, <https://www.cybertalk.org/2019/09/23/attackers-are-calling-voice-phishing-on-the-rise/>.

"Trusted-AI / adversarial-robustness-toolbox", GitHub, Printed Apr. 13, 2021, 2 pages, <https://github.com/Trusted-AI/adversarial-robustness-toolbox/tree/main/tests/attacks>.

"Voice Phishing" Wikipedia, Apr. 10, 2021, 10 pages, <https://en.wikipedia.org/wiki/Voice_phishing>.

Carlini et al., "Audio Adversarial Examples: Targeted Attacks on Speech-to-Text", arXiv, Cornell University, Mar. 30, 2016, 7 pages, <https://arxiv.org/pdf/1801.01944.pdf>.

Carlini, Nicholas, "Targeted Adversarial Examples on Speech-to-Text systems", GitHub, Sep. 8, 2020, 5 pages, <https://github.com/carlini/audio_adversarial_examples>.

Ganin et al., "Domain-Adversarial Training of Neural Networks", Journal of Machine Learning Research, vol. 17, May 26, 2016, arXiv, Cornell University, pp. 1-35, <https://arxiv.org/abs/1505.07818>.

Gong et al., "Real-Time Adversarial Attacks", arXiv, Cornell University, May 31, 2019, 9 pages, <https://arxiv.org/pdf/1905.13399v1.pdf>.

Hannun, Awni, "Sequence Modeling With CTC", Distill, Nov. 27, 2017, 20 pages, <https://distill.pub/2017/ctc/>.

Su et al., "Zika Virus as Oncolytic Therapy for Brain Cancer: Myth or Reality?", Frontiers in Microbiology, Nov. 20, 2019, 8 pages, <https://www.ncbi.nlm.nih.gov/pmc/articles/PMC6879458/>.

Tramer et al., "Ensemble Adversarial Training: Attacks and Defenses", ar Xiv, Cornell University, Apr. 26, 2020, 22 pages, <https://arxiv.org/abs/1705.07204>.

International Search Report and Written Opinion, International Application No. PCT/CN2022/092670, International Filing Date May 13, 2022.

* cited by examiner

PROHIBITING VOICE ATTACKS

BACKGROUND

The present disclosure relates generally to the field of voice security, and more particularly to prohibiting voice attacks.

Voice phishing, or vishing, may be the use of telephony, often Voice over Internet Protocol (VoIP) telephony, to conduct phishing attacks. Landline telephone services have traditionally been trustworthy. Now however, vishing fraudsters often use modern VoIP features to impede detection. Voice phishing may be typically used to steal credit card numbers or other information used in identity theft schemes from individuals. Voice phishing attacks may be conducted using automated text-to-speech systems that direct a victim to call a number controlled by the attacker. The fraudster may attempt to obtain personal details and financial information regarding credit card, bank accounts, as well as personal information of the victim. VoIP, also called IP telephony, may be a method and group of technologies for the delivery of voice communications and multimedia sessions over IP networks, such as the Internet. Over the years, attackers have improved their tactics and leveraging advanced technologies such as artificial intelligence to empower their techniques and became more effective into fooling subscribers.

SUMMARY

Aspects of an embodiment of the present disclosure disclose an approach for prohibiting voice attacks. A processor, in response to receiving a voice input from a source, determines, using a predetermined filter including an allowlist, that the voice input does not match any corresponding entry of the predetermined filter. A processor routes the voice input to an adversarial pipeline for processing. A processor identifies an adversarial example of the voice input using a predetermined connectionist temporal classification method. A processor generates a configurable distorted adversarial example using the adversarial example identified. In response to a user reply, a processor injects the configurable distorted adversarial example as noise into a voice stream of the user reply in real-time to alter the voice stream. A processor routes the altered voice stream to the source.

DETAILED DESCRIPTION

The present disclosure is directed to systems and methods for prohibiting voice attacks.

Embodiments of the present disclosure recognize a need for utilizing an available media to inject adversarial data into voice patterns to counter artificial intelligence (AI) based voice phishing schemes. Embodiments of the present disclosure disclose making AI based voice phishing schemes fail to properly classify user answers and fail to proceed with the attacker's scam. Embodiments of the present disclosure disclose that a 4G/5G network may include an IP core network to transmit voice over the IP network through routing. Voice may be data that transits over the network.

Embodiments of the present disclosure disclose an improvement to be applied to an adversarial robustness toolbox which will allow for injection of real-time adversarial samples. Embodiments of the present disclosure disclose applying a real-time speech pipeline. Embodiments of the present disclosure disclose embedding the adversarial robustness toolbox into an IP core network, which may inject a real-time adversarial attack into a voice stream. Embodiments of the present disclosure disclose inserting noise into the voice stream, wherein a chatbot may get confused and may either hang up or end up asking questions that will make a user aware a probable scam. Embodiments of the present disclosure disclose hashing the voice stream and adding the voice stream to a list, which may be used as threat-intelligence for the future, to provide carriers with intelligence information about probable audios being re-used for attacks.

Embodiments of the present disclosure disclose an allowlist, which may be a programmable hash-table responsible for keeping all allowed and known chatbot sources that should not be sent to an adversarial pipeline. The adversarial pipeline may be a real-time adversarial sample generator that may attack audio samples and may poison the audio that will be processed by an untrusted (e.g., malicious) chatbot. Embodiments of the present disclosure disclose adding adversarial noise so that a chatbot cannot be used. Embodiments of the present disclosure disclose triggering adversarial noise manually to trick a chatbot.

Figure 1:
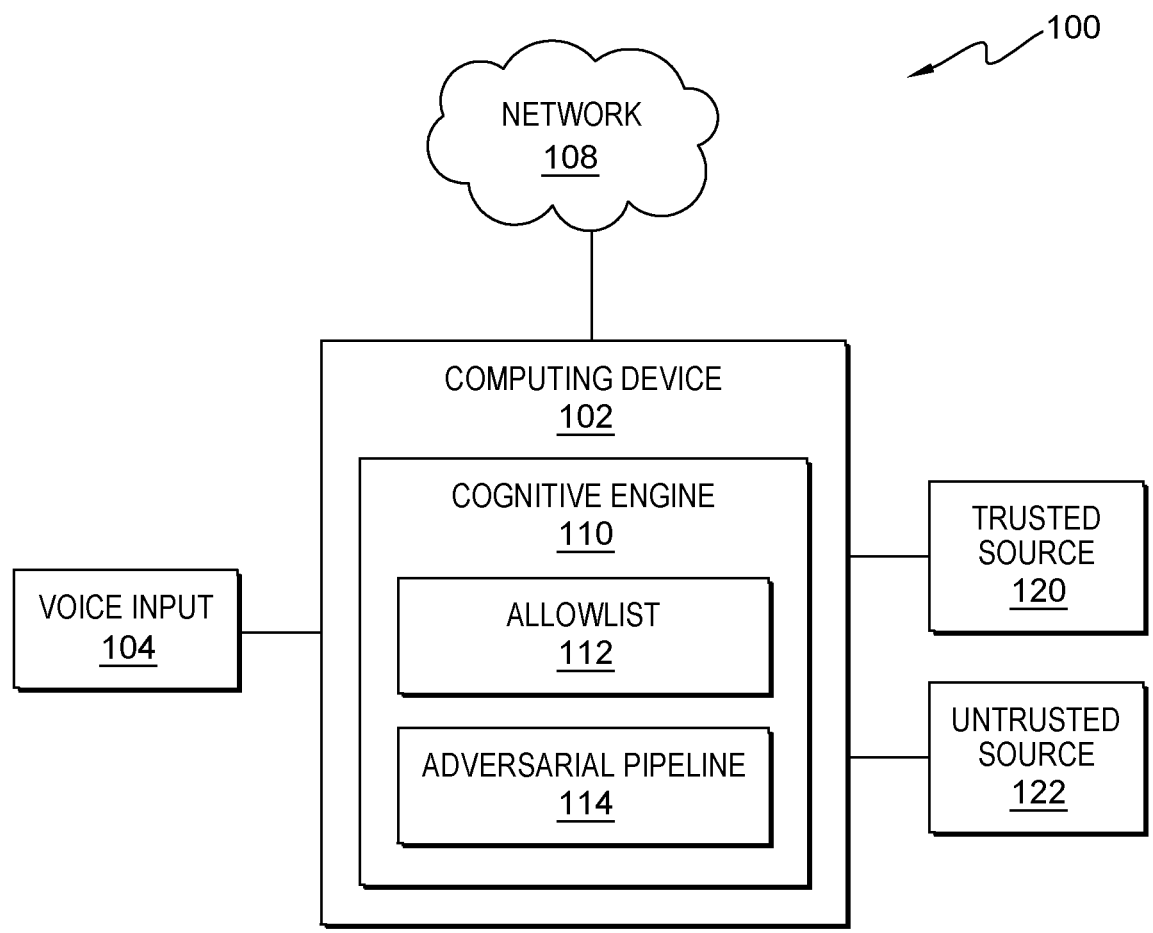
FIG. 1 is a functional block diagram illustrating a voice phishing prohibition environment, in accordance with an embodiment of the present disclosure.

The present disclosure will now be described in detail with reference to the Figures. FIG. 1 is a functional block diagram illustrating a voice phishing prohibition environment, generally designated 100, in accordance with an embodiment of the present disclosure.

In the depicted embodiment, voice phishing prohibition environment 100 includes computing device 102, voice input 104, trusted source 120, untrusted source 122, and network 108. Voice input 104 may be voice transformed into VoIP that transits over network 108 through routing. Voice may be data that may transit over network 108. When an attacker executes voice phishing, the voice phishing may process over a chatbot system that can be trained to work on a question/answer basis and to convert voice to text to store the information as well as the voice stream.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to voice phishing prohibition module 110 and network 108 and is capable of processing program instructions and executing voice phishing prohibition module 110, in accordance with an embodiment of the present disclosure. Computing device 102 may include internal and external hardware components, as depicted and described in further detail with respect to FIG. 7.

Further, in the depicted embodiment, computing device 102 includes voice phishing prohibition module 110. In the depicted embodiment, voice phishing prohibition module 110 is located on computing device 102. However, in other embodiments, voice phishing prohibition module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and voice phishing prohibition module 110, in accordance with a desired embodiment of the disclosure.

In the depicted embodiment, voice phishing prohibition module 110 includes allowlist 112 and adversarial pipeline 114. In one or more embodiments, allowlist 112 is a programmable hash-table responsible for keeping all allowed and known trusted source 120 (e.g., a normal chatbot) that should not be sent to adversarial pipeline 114. Allowlist 112 may help determining which source is trusted source 120. Allowlist 112 may allow for known, trusted, certified chatbots and may detect probable zero-day software attacks which would exploit the software vulnerability before software developers can find a fix.

In one or more embodiments, adversarial pipeline 114 may be a real-time adversarial sample generator. Voice may be treated as a data stream, transiting over an IP network (e.g., network 108). In an example, adversarial attacks may be the combination of techniques used to fool a machine-learning model into miss-classifying data. Adversarial attacks may fool attackers and may reduce the attackers' success rate over voice networks. Adversarial pipeline 114 may generate audio samples that may poison the audio that will be processed by untrusted source 122 (e.g., a malicious chatbot). Adversarial pipeline 114 may include an input that receives the voice traffic. Adversarial pipeline 114 may include an adversarial robustness toolkit or any other adversarial attack library generator that can apply such attack into audio streams. Adversarial pipeline 114 may include an output that may encapsule and may give continuity to the audio traffic through a voice network (e.g., network 108). In an example, adversarial pipeline 114 may be a real-time pipeline that can insert adversarial attacks into voice input 104, causing a source that is calling a user to fail to transcribe speech to text, hence, failing to steal information over a phone.

In one or more embodiments, voice phishing prohibition module 110 is configured to receive voice input 104. Voice input 104 may be voice transformed into VoIP that transits over network 108 through routing. Voice may be data that may transit over network 108. When an attacker executes voice phishing, the voice phishing may process over a chatbot system that can be trained to work on a question/answer basis and to convert voice to text to store the information as well as the voice stream. Voice phishing prohibition module 110 may determine, using a predetermined filter including allowlist 112, whether voice input 104 is a match for a corresponding entry of the predetermined filter. Allowlist 112 may be a programmable hash-table responsible for keeping all allowed and known chatbot sources that should not be sent to adversarial pipeline 114.

In one or more embodiments, voice phishing prohibition module 110 is configured to identify voice input 104 as from trusted source 120. Voice phishing prohibition module 110 may determine that voice input 104 is a match for a corresponding entry of the predetermined filter in allowlist 112. Voice phishing prohibition module 110 may route voice input 104 from trusted source 120 for normal processing.

In one or more embodiments, voice phishing prohibition module 110 is configured to, in response that voice input 104 is not a match for a corresponding entry of the predetermined filter, identify voice input 104 as from untrusted source 122. Voice phishing prohibition module 110 may route voice input 104 from untrusted source 122 to adversarial pipeline 114 for processing. Voice phishing prohibition module 110 may identify an adversarial example of voice input 104 using a predetermined connectionist temporal classification (CTC) method. Voice phishing prohibition module 110 may generate a configurable distorted adversarial example using the adversarial example identified. Voice phishing prohibition module 110 may configure a distortion level so that the distorted adversarial example may still be recognized by a human being. Voice phishing prohibition module 110 may inject the configurable distorted adversarial example as noise into a voice stream in real-time to create a poison voice stream. Voice phishing prohibition module 110 may inject the configurable distorted adversarial example as noise into a voice stream in real-time to alter the voice stream. Voice phishing prohibition module 110 may route the poison voice stream to untrusted source 122. For example, voice phishing prohibition module 110 may add a white noise (e.g. −30 db noise) to the audio stream as described below. First, voice phishing prohibition module 110 may let x0 be an adversarial example found using the CTC loss. The CTC loss may explicitly construct an alignment during decoding. Voice phishing prohibition module 110 may extract the alignment $\pi$ that is induced by x0 (by computing $\pi = \arg\max_i f(x0)_i$). Voice phishing prohibition module 110 may fix this alignment $\pi$ and use the alignment $\pi$ as the target in the next step. Next, holding the alignment $\pi$ fixed, voice phishing prohibition module 110 may generate a configurable distorted adversarial example x' targeting the alignment $\pi$ using the improved loss function above to minimize $|\delta|_2^2 + \Sigma_i c_i \cdot l_i(x+\delta, \pi)$, starting gradient descent at the initial point $\delta = x0 - x$. In another example, voice phishing prohibition module 110 may apply a real-time speech pipeline. Voice phishing prohibition module 110 may inject a real-time adversarial attack into a voice stream. By inserting noise into the voice stream, voice phishing prohibition module 110 may confuse untrusted source 122 (e.g., a malicious chatbot).

In one or more embodiments, voice phishing prohibition module 110 is configured to create a hash value representative of the poison voice stream. Voice phishing prohibition module 110 may add the hash value to a list of probable audio samples used in the voice phishing attacks. For example, after injecting the noise into the voice stream, voice phishing prohibition module 110 may hash the voice stream and add the hash value to a list, which can provide intelligence information about probable audios being re-used for attacks. Voice phishing prohibition module 110 may track the poisoned data, not only to drop the poisoned data if seen but also to determine if attackers are starting to use the poisoned data.

Figure 2:
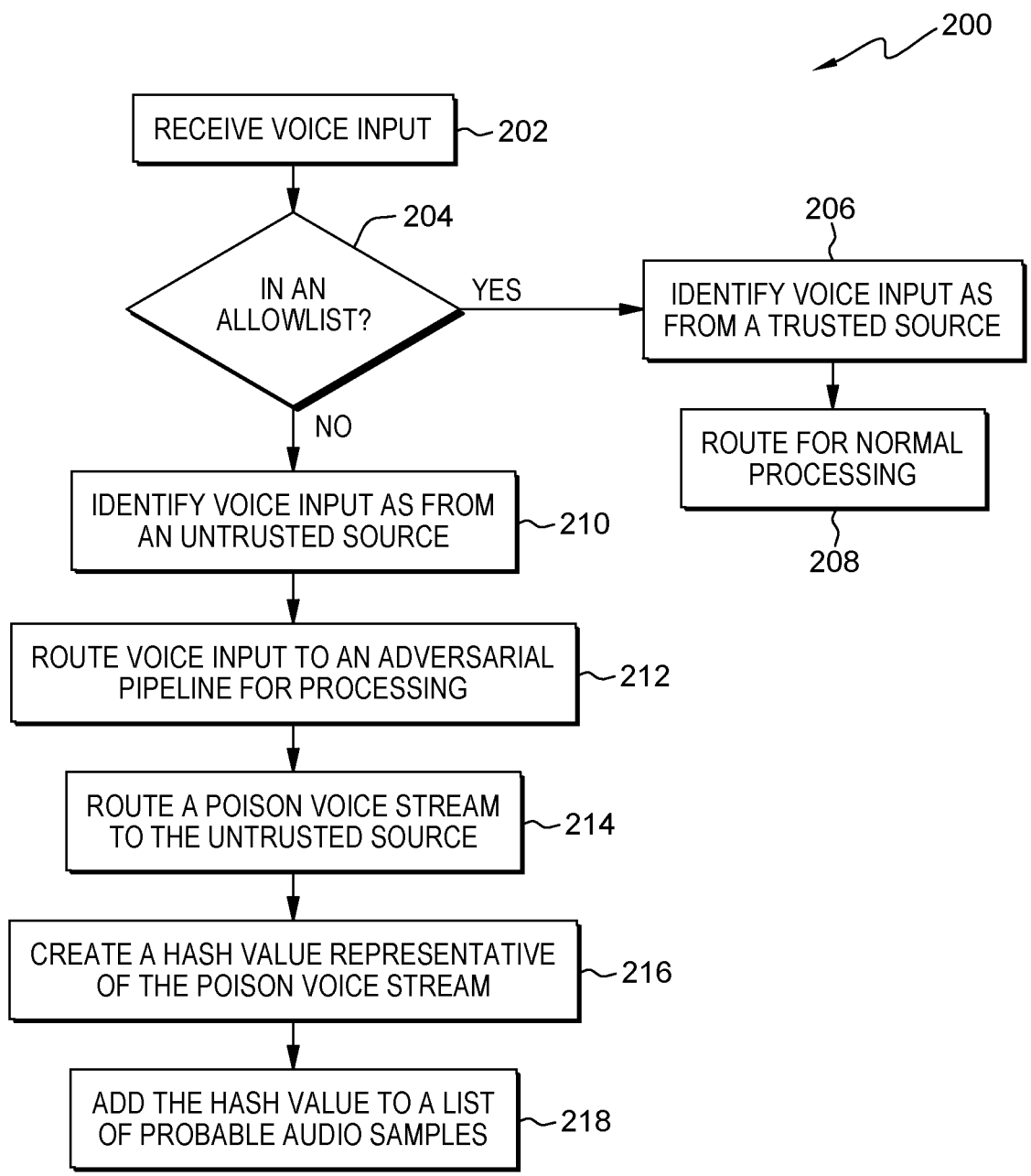
FIG. 2 is a flowchart depicting operational steps of a voice phishing prohibition module within a computing device of FIG. 1, in accordance with an embodiment of the present disclosure.

FIG. 2 is a flowchart 200 depicting operational steps of voice phishing prohibition module 110 in accordance with an embodiment of the present disclosure.

Voice phishing prohibition module 110 operates to receive voice input 104. Voice input 104 may be voice transformed into VoIP that transits over network 108 through routing. Voice phishing prohibition module 110 also operates to determine whether, using a predetermined filter including allowlist 112, voice input 104 is a match for a corresponding entry of the predetermined filter. If voice phishing prohibition module 110 determines that voice input 104 is a match for a corresponding entry of the predetermined filter, voice phishing prohibition module 110 operates to identify voice input 104 as from trusted source 120. Voice phishing prohibition module 110 operates to route voice input 104 from trusted source 120 for normal processing. If voice phishing prohibition module 110 determines that voice input 104 is not a match for a corresponding entry of the predetermined filter in allowlist 112, voice phishing prohibition module 110 operates to identify voice input 104 as from untrusted source 122. Voice phishing prohibition module 110 operates to route voice input 104 from untrusted source 122 to adversarial pipeline 114 for processing. Voice phishing prohibition module 110 operates to route the poison voice stream to untrusted source 122. Voice phishing prohibition module 110 operates to create a hash value representative of the poison voice stream. Voice phishing prohibition module 110 operates to add the hash value to a list of probable audio samples used in the voice phishing attacks.

In step 202, voice phishing prohibition module 110 receives voice input 104. Voice input 104 may be voice transformed into VoIP that transits over network 108 through routing. Voice may be data that may transit over network 108. When an attacker executes voice phishing, the voice phishing may process over a chatbot system that can be trained to work on a question/answer basis and to convert voice to text to store the information as well as the voice stream.

In decision 204, voice phishing prohibition module 110 determines whether, using a predetermined filter including allowlist 112, voice input 104 is a match for a corresponding entry of the predetermined filter. Allowlist 112 may be a programmable hash-table responsible for keeping all trusted sources (e.g., allowed and known chatbot sources) that should not be sent to adversarial pipeline 114. If voice phishing prohibition module 110 determines that voice input 104 is a match for a corresponding entry of the predetermined filter in allowlist 112 (decision 204, "YES" branch), in step 206, voice phishing prohibition module 110 identifies voice input 104 as from trusted source 120. In step 208, voice phishing prohibition module 110 routes voice input 104 from trusted source 120 for normal processing.

If voice phishing prohibition module 110 determines that voice input 104 is not a match for a corresponding entry of the predetermined filter in allowlist 112 (decision 204, "NO" branch), in step 210, voice phishing prohibition module 110 identifies voice input 104 as from untrusted source 122. In step 212, voice phishing prohibition module 110 routes voice input 104 from untrusted source 122 to adversarial pipeline 114 for processing. Voice phishing prohibition module 110 may identify an adversarial example of voice input 104 using a predetermined CTC method. Voice phishing prohibition module 110 may generate a configurable distorted adversarial example using the adversarial example identified. Voice phishing prohibition module 110 may configure a distortion level so that the distorted adversarial example may still be recognized by a human being. Voice phishing prohibition module 110 may inject the configurable distorted adversarial example as noise into a voice stream in real-time to create a poison voice stream. Voice phishing prohibition module 110 may inject the configurable distorted adversarial example as noise into a voice stream in real-time to alter the voice stream. For example, voice phishing prohibition module 110 may add a white noise (e.g. −30 db noise) to the audio stream as described below. First, voice phishing prohibition module 110 may let x0 be an adversarial example found using the CTC loss. The CTC loss may explicitly construct an alignment during decoding. Voice phishing prohibition module 110 may extract the alignment $\pi$ that is induced by x0 (by computing $\pi$=arg maxi f(x0)i). Voice phishing prohibition module 110 may fix this alignment $\pi$ and use the alignment $\pi$ as the target in the next step. Next, holding the alignment $\pi$ fixed, voice phishing prohibition module 110 may generate a configurable distorted adversarial example x' targeting the alignment $\pi$ using the improved loss function above to minimize $|\delta|_2^2+\Sigma_i c_i \cdot l_i(x+\delta,\pi)$, starting gradient descent at the initial point $\delta$=x0−x. In another example, voice phishing prohibition module 110 may apply a real-time speech pipeline. Voice phishing prohibition module 110 may inject a real-time adversarial attack into a voice stream. By inserting noise into the voice stream, voice phishing prohibition module 110 may confuse untrusted source 122 (e.g., a malicious chatbot).

In step 214, voice phishing prohibition module 110 routes the poison voice stream to untrusted source 122. In step 216, voice phishing prohibition module 110 creates a hash value representative of the poison voice stream. In step 218, voice phishing prohibition module 110 adds the hash value to a list of probable audio samples used in the voice phishing attacks. For example, after injecting the noise into the voice stream, voice phishing prohibition module 110 may hash the voice stream and add the hash value to a list, which can provide intelligence information about probable audios being re-used for attacks. Voice phishing prohibition module 110 may track the poisoned data, not only to drop the poisoned data if seen but also to determine if attackers are starting to use the poisoned data.

Figure 3:
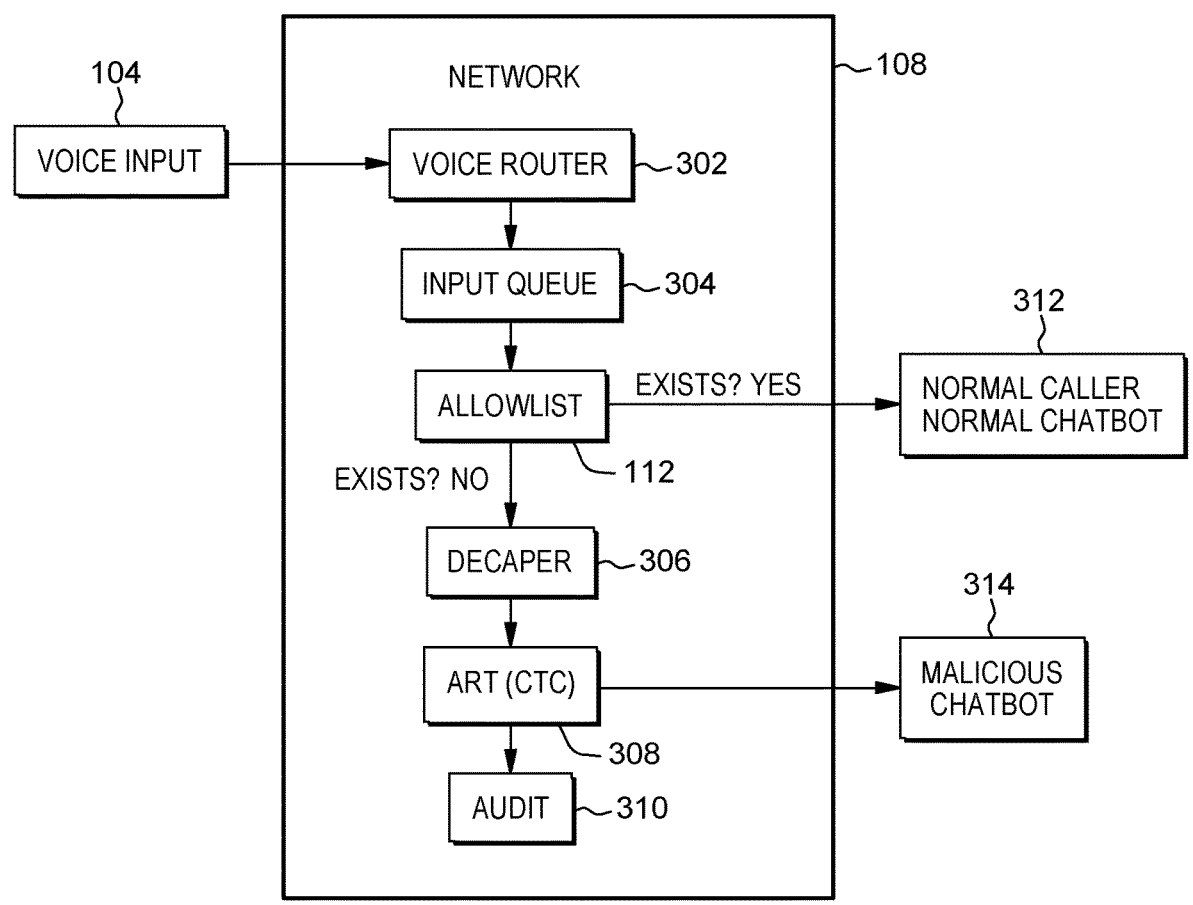
FIG. 3 illustrates an exemplary functional diagram of the voice phishing prohibition module within the computing device of FIG. 1, in accordance with an embodiment of the present disclosure.

FIG. 3 illustrates an exemplary functional diagram of voice phishing prohibition module 110, in accordance with an embodiment of the present disclosure.

In the example of FIG. 3, voice phishing prohibition module 110 receives voice input 104 through voice router 302 in network 108. Voice input 104 may be put in input queue 304. Voice phishing prohibition module 110 determines whether voice input 104 is a match for a corresponding entry of allowlist 112. If voice phishing prohibition module 110 determines that voice input 104 is a match for a corresponding entry in allowlist 112, voice phishing prohibition module 110 routes voice input 104 for normal processing (e.g., normal caller and normal chatbot 312). If voice phishing prohibition module 110 determines that voice input 104 is not a match for a corresponding entry in allowlist 112, voice phishing prohibition module 110 may decapsulate voice input 104 in decapper 306. Voice phishing prohibition module 110 may route voice input 104 to adversarial pipeline 114 for processing. Voice phishing prohibition module 110 may identify an adversarial example of voice input 104 using CTC method 308. Voice phishing prohibition module 110 may generate a configurable distorted adversarial example using the adversarial example identified. Voice phishing prohibition module 110 may inject the configurable distorted adversarial example as noise into a voice stream in real-time to create a poison voice stream. By inserting noise into the voice stream, voice phishing prohibition module 110 may confuse malicious chatbot 314. Voice phishing prohibition module 110 may route the poison voice stream to malicious chatbot 314. Voice phishing prohibition module 110 may create a hash value representative of the poison voice stream in audit 310. Voice phishing prohibition module 110 may add the hash value to a list of probable audio samples used in the voice phishing attacks.

Figure 4:
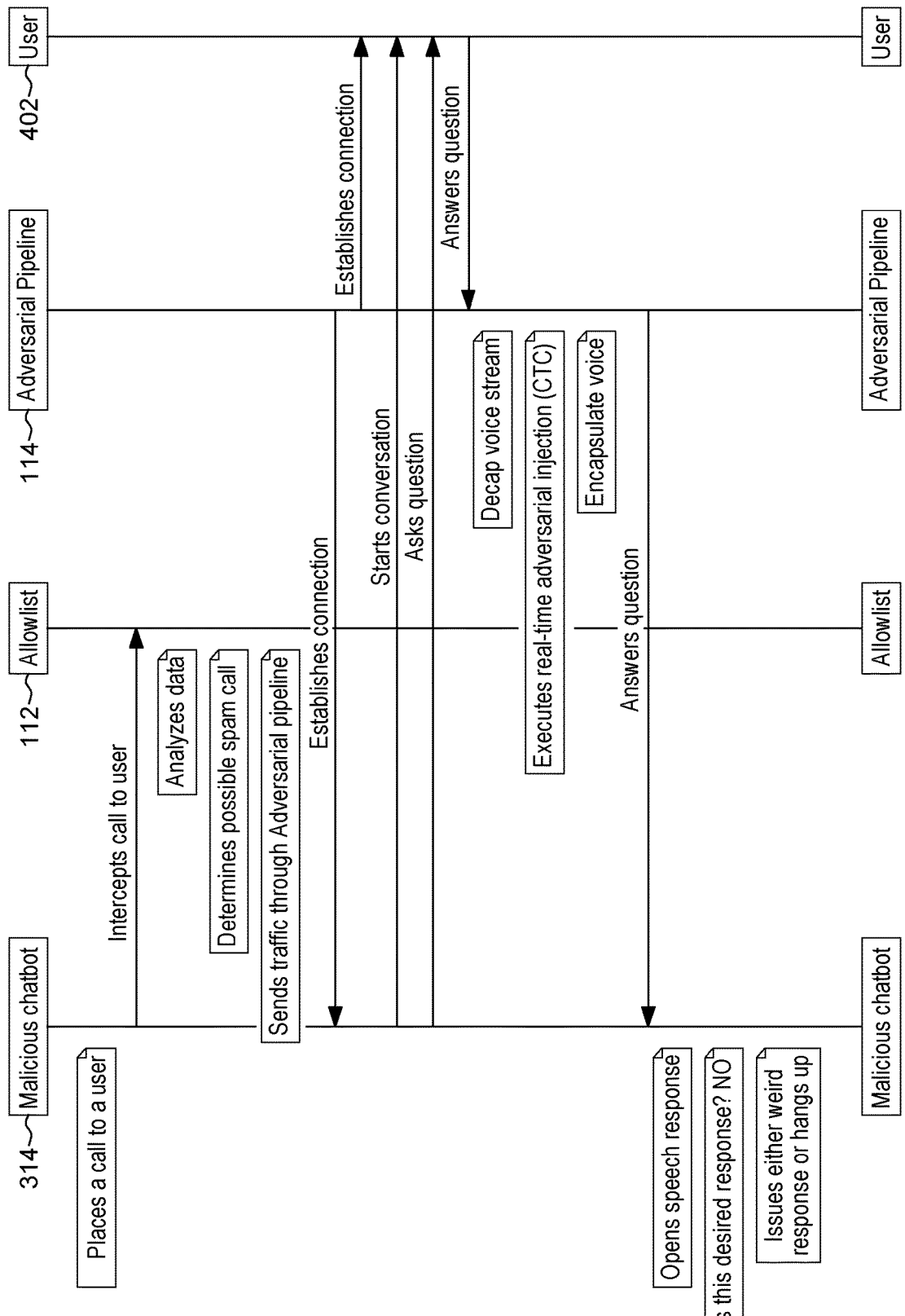
FIG. 4 illustrates an exemplary functional flowchart of the voice phishing prohibition module within the computing device of FIG. 1, in accordance with an embodiment of the present disclosure.

FIG. 4 illustrates an exemplary functional flowchart of voice phishing prohibition module 110, in accordance with an embodiment of the present disclosure.

In the example of FIG. 4, malicious chatbot 314 may place a call to user 402. Voice phishing prohibition module 110 may intercept the call to user 402. Voice phishing prohibition module 110 may analyze data of the call. Voice phishing prohibition module 110 may determine a possible spam call via allowlist 112. Voice phishing prohibition module 110 may send voice traffic through adversarial pipeline 114. Adversarial pipeline 114 may establish connection to malicious chatbot 314. Adversarial pipeline 114 may establish connection to user 402. Malicious chatbot 314 may start conversation with user 402. Malicious chatbot 314 may ask questions to user 402. User 402 may answer questions to adversarial pipeline 114. Voice phishing prohibition module 110 may decapsulate the voice stream through adversarial pipeline 114. Voice phishing prohibition module 110 may execute real-time adversarial inspection through adversarial pipeline 114. Voice phishing prohibition module 110 may encapsulate voice. User 402 may answer questions to malicious chatbot 314 with the processed voice stream. Malicious chatbot 314 may open speech responses. Malicious chatbot 314 may not receive a desired response. Malicious chatbot 314 may issue either wield response or may just hang up.

Figure 5:
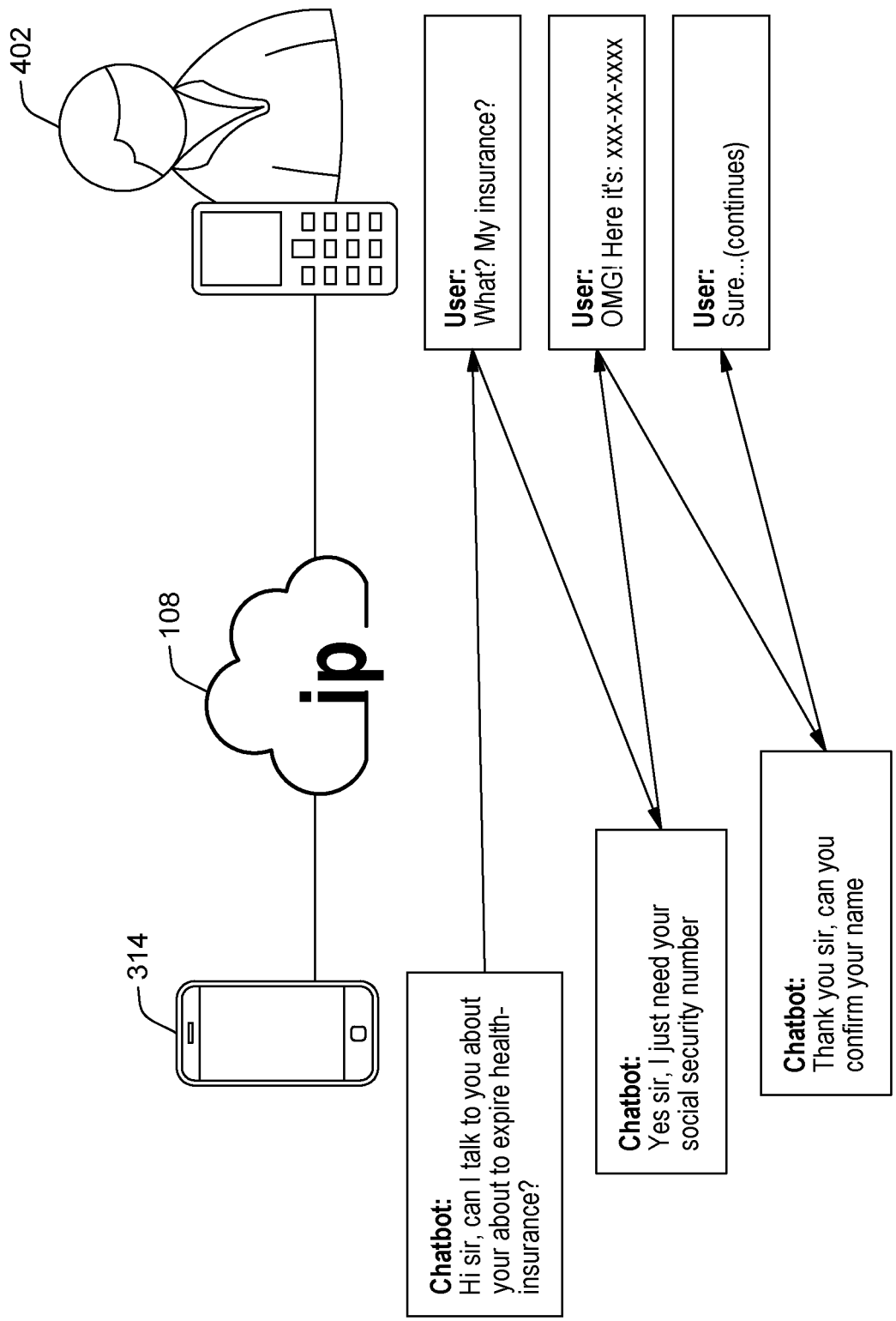
FIG. 5 illustrates an exemplary user scenario without the voice phishing prohibition module implemented in the computing device of FIG. 1, in accordance with an embodiment of the present disclosure.
Figure 6:
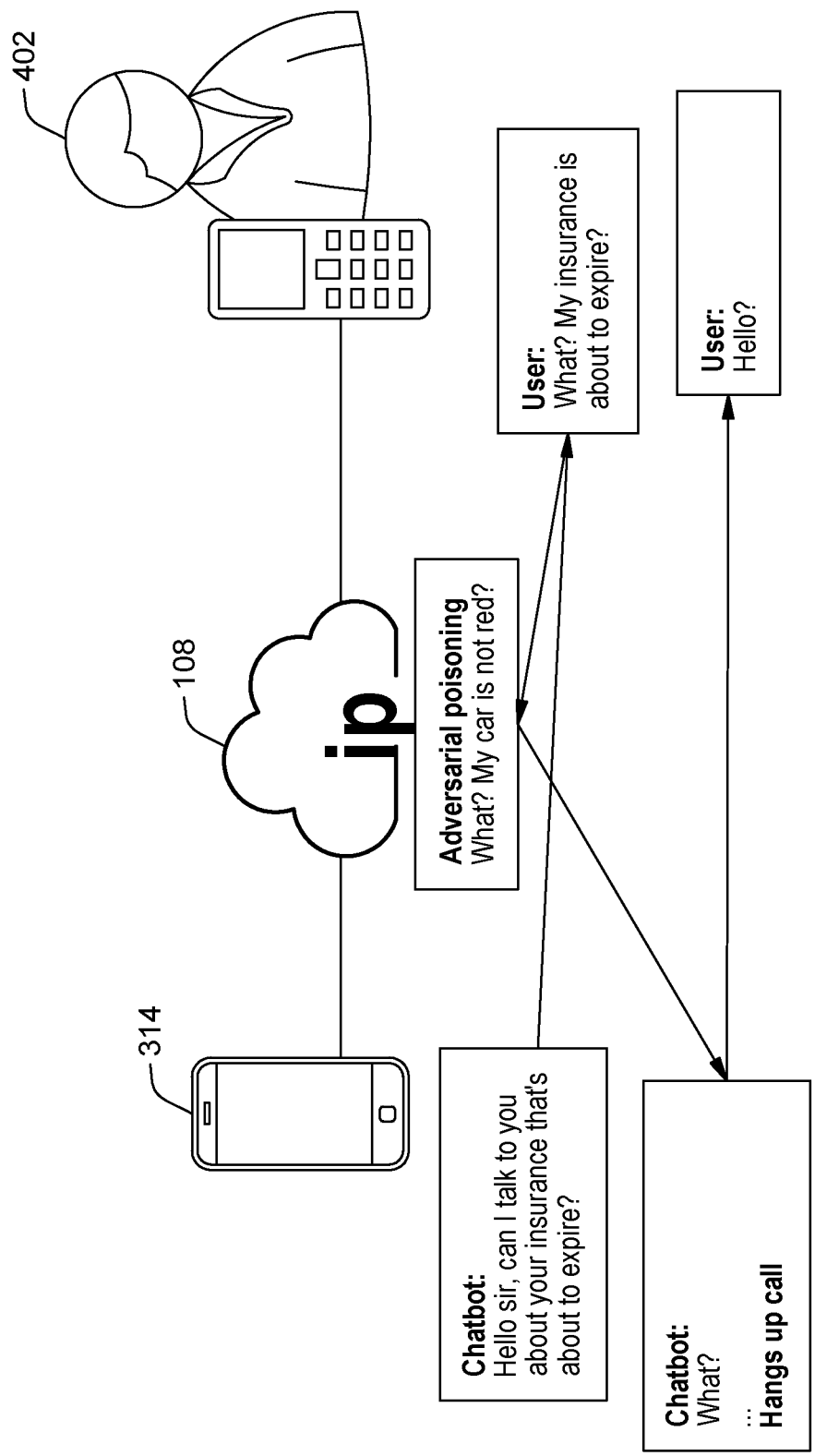
FIG. 6 illustrates an exemplary user scenario with the voice phishing prohibition module implemented in the computing device of FIG. 1, in accordance with an embodiment of the present disclosure.

FIG. 5 illustrates an exemplary user scenario without voice phishing prohibition module 110 implemented, in accordance with an embodiment of the present disclosure. FIG. 6 illustrates an exemplary user scenario with voice phishing prohibition module 110 implemented, in accordance with an embodiment of the present disclosure.

In the example of FIG. 5, without voice phishing prohibition module 110 implemented, malicious chatbot 314 may perform voice phishing to user 402. Once malicious chatbot acquires all the scripted answers, malicious chatbot 314 may hang up and may turn into identity theft or voice recording or something else entirely. In the example of FIG. 6, with voice phishing prohibition module 110 implemented, malicious chatbot 314 may not receive a desired response. Malicious chatbot 314 may issue either a wield response or may just hang up without getting useful information from user 402.

Figure 7:
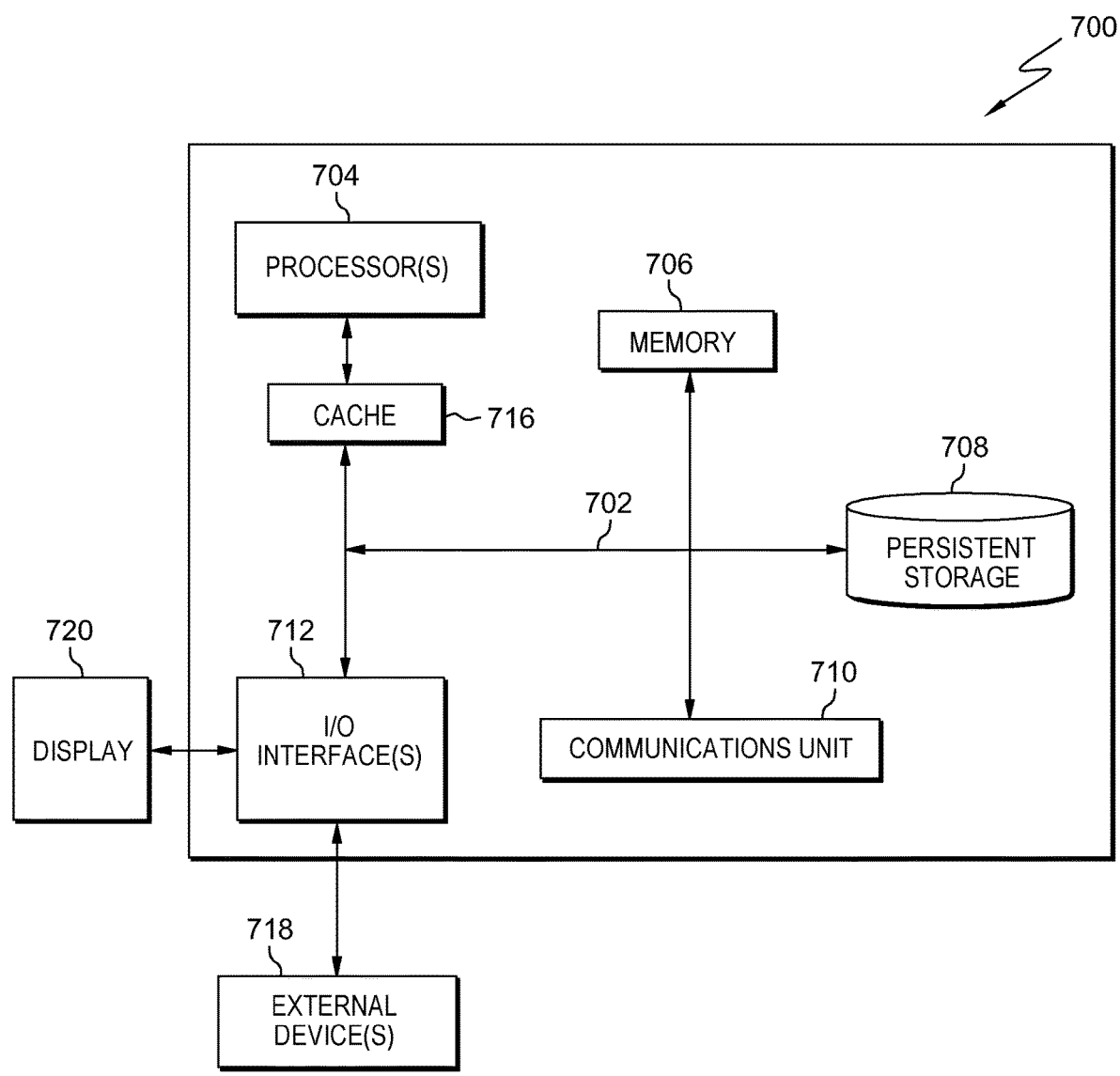
FIG. 7 is a block diagram of components of the computing device of FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Voice phishing prohibition module 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Voice phishing prohibition module 110 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., voice phishing prohibition module 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   in response to receiving a voice input from a source, determining, using a predetermined filter including an allowlist, by one or more processors, that the voice input does not match any corresponding entry of the predetermined filter;
   routing, by one or more processors, the voice input to an adversarial pipeline for processing by:
      identifying an adversarial example of the voice input using a predetermined connectionist temporal classification (CTC) method;
      generating a configurable distorted adversarial example using the adversarial example identified; and
      in response to a user reply, injecting the configurable distorted adversarial example as noise into a voice stream of the user reply in real-time to alter the voice stream; and
   routing, by one or more processors, the altered voice stream to the source.

2. The computer-implemented method of claim 1, further comprising:
   creating a hash value representative of the altered voice stream; and
   adding the hash value to a list of probable audio samples used in a voice attack.

3. The computer-implemented method of claim 1, further comprising:
   injecting a real-time adversarial attack into the voice stream.

4. The computer-implemented method of claim 1, further comprising:
   adding adversarial noise so that the untrusted source cannot be used; and
   triggering adversarial noise manually.

5. The computer-implemented method of claim 1, further comprising tracking the altered voice stream.

6. The computer-implemented method of claim 1, wherein the allowlist is a programmable hash-table.

7. The computer-implemented method of claim 1, wherein the noise is white noise.

8. A computer program product comprising:
   one or more computer readable storage media, and program instructions collectively stored on the one or more computer readable storage media, the program instructions comprising:
   program instructions to, in response to receiving a voice input from a source, determine, using a predetermined filter including an allowlist, that the voice input does not match any corresponding entry of the predetermined filter;
   program instructions to route the voice input to an adversarial pipeline for processing by:
      program instructions to identify an adversarial example of the voice input using a predetermined CTC method;
      program instructions to generate a configurable distorted adversarial example using the adversarial example identified; and
      program instructions to, in response to a user reply, inject the configurable distorted adversarial example as noise into a voice stream of the user reply in real-time to alter the voice stream; and
   program instructions to route the altered voice stream to the source.

9. The computer program product of claim 8, further comprising:
   program instructions to create a hash value representative of the altered voice stream; and
   program instructions to add the hash value to a list of probable audio samples used in a voice attack.

10. The computer program product of claim 8, further comprising:
    program instructions to inject a real-time adversarial attack into the voice stream.

11. The computer program product of claim 8, further comprising:
    program instructions to add adversarial noise so that the untrusted source cannot be used; and
    program instructions to trigger adversarial noise manually.

12. The computer program product of claim 8, further comprising program instructions to track the altered voice stream.

13. The computer program product of claim 8, wherein the allowlist is a programmable hash-table.

14. The computer program product of claim 8, wherein the noise is white noise.

15. A computer system comprising:
    one or more computer processors, one or more computer readable storage media, and program instructions stored on the one or more computer readable storage media for execution by at least one of the one or more computer processors, the program instructions comprising:
    program instructions to, in response to receiving a voice input from a source, determine, using a predetermined filter including an allowlist, that the voice input does not match any corresponding entry of the predetermined filter;
    program instructions to route the voice input to an adversarial pipeline for processing by:
       program instructions to identify an adversarial example of the voice input using a predetermined CTC method;
       program instructions to generate a configurable distorted adversarial example using the adversarial example identified; and
       program instructions to, in response to a user reply, inject the configurable distorted adversarial example as noise into a voice stream of the user reply in real-time to alter the voice stream; and
    program instructions to route the altered voice stream to the source.

16. The computer system of claim 15, further comprising:
program instructions to create a hash value representative of the altered voice stream; and
program instructions to add the hash value to a list of probable audio samples used in a voice attack.

17. The computer system of claim 15, further comprising:
program instructions to inject a real-time adversarial attack into the voice stream.

18. The computer system of claim 15, further comprising:
program instructions to add adversarial noise so that the untrusted source cannot be used; and
program instructions to trigger adversarial noise manually.

19. The computer system of claim 15, further comprising program instructions to track the altered voice stream.

20. The computer system of claim 15, wherein the allow-list is a programmable hash-table.

\* \* \* \* \*